United States Patent [19]

Morrison

[11] 4,030,642

[45] June 21, 1977

[54] ROTARY FEEDER CONSTRUCTION

[75] Inventor: Charles B. Morrison, Oregon, Ohio

[73] Assignee: Phillips Petroleum Company, Bartlesville, Okla.

[22] Filed: Nov. 15, 1973

[21] Appl. No.: 416,061

[52] U.S. Cl. .............................. 222/368; 222/194; 302/49

[51] Int. Cl.² ........................................ G01F 11/24

[58] Field of Search .................. 302/49, 42, 56, 52; 222/194, 367, 368, 410; 259/45, 46, 4, 6, 9, 10

[56] References Cited

UNITED STATES PATENTS

| | | | |
|---|---|---|---|
| 2,164,618 | 7/1939 | Masters | 259/46 |
| 3,403,942 | 10/1968 | Farnworth | 302/49 |
| 3,556,606 | 1/1971 | Woods | 302/42 |
| 3,574,411 | 4/1971 | Miller | 302/49 |
| 3,593,891 | 7/1971 | Kidd | 302/49 |
| 3,934,937 | 1/1976 | Tee et al. | 302/49 |

FOREIGN PATENTS OR APPLICATIONS

| | | | |
|---|---|---|---|
| 693,841 | 9/1964 | Canada | 259/10 |
| 851,366 | 1/1940 | France | 259/9 |
| 556,880 | 7/1932 | Germany | 222/368 |

Primary Examiner—Evon C. Blunk
Assistant Examiner—Jeffrey V. Nase
Attorney, Agent, or Firm—Neuman, Williams, Anderson & Olson

[57] ABSTRACT

Alternate vanes on the valve of a rotary feeder for feeding particulate material effect clearances with the surrounding feeder housing surface to effect desired, controlled flow of the particulate material. The clearances between the alternate vanes and the housing may comprise a variety of forms such as notches disposed in the alternate vane distal edges. Also, the radial length of the alternate vanes may be shortened to effect the desired clearances. Such clearances also greatly increase the permissible feeding rates.

6 Claims, 4 Drawing Figures

ROTARY FEEDER CONSTRUCTION

BACKGROUND OF THE INVENTION

This invention relates to the transfer of particulate matter, and more particularly pertains to a rotary feeder construction which efficiently transfers said matter at desirably high, controlled rates to a zone of use from a supply source.

In prior art processes for feeding particulate material by means of rotary feeders, various expedients have been employed to effect desired feeding of such material to a zone of use. Thus, in Kidd U.S. Pat. No. 3,593,891 which issued July 20, 1971, a star feeder is provided in which a rotatable wheel is eccentrically mounted relative to the surrounding casing wall whereby the teeth thereof form an air seal when approaching the incoming material to be fed and are subsequently spaced from the casing wall in the course of rotation. Conveying pockets formed by the wheel teeth may thus carry the material into a feed line.

In Stern U.S. Pat. No. 3,223,288 which issued Dec. 14, 1965, a feeder employing rotating vanes having fluid passageways is employed in which the clearance between each of the vane distal edges and the housing wall is maintained as small as possible. In Woods U.S. Pat. No. 3,556,606 which issued Jan. 19, 1971, the flow of carbon black from a rotary feeder is maintained uniformly by a by-pass loop disposed about the rotary valve inter-connecting a supply hopper and zone of use whereby excessive pressure build-up in said supply hopper may be relieved.

The apparatus of this invention comprises a rotary feeder employing a rotatable valve having radially extending vanes secured at their proximal ends to a central rotatable shaft. The valve is rotatable within a feeder housing communicating with a supply source of the particulate material to be fed, such as a hopper, and a conduit leading to a zone of use for such particulate material.

In accordance with this invention alternate vanes of the rotatable valve have clearances interposed such vanes and the surrounding housing wall. Such clearances may take the form of notches in the vane edges, apertures through the vane bodies or intervals between the vane distal edges and the casing wall.

SUMMARY OF THE INVENTION

It is an object of this invention, therefore, to provide a rotary feeder construction for particulate material, interposed a supply source for such material and a zone of use which provides desirable, even feeding of the particulate material into said zone of use.

It is another object of this invention to provide a rotary feeder construction for particulate material in which consistent, even feeding is provided over varying rates of feed necessitated by varying consumption rates in a zone of use in communication with said feeder.

It is yet another object of this invention to provide a rotary feeder construction adapted to uniformly feed particulate material at exceedingly high rates of flow by a simple modification of the radial vanes employed in the rotatable valve of such feeder.

The above and other objects of this invention will become more apparent from the following description when read in the light of the appended claims and the drawing in which:

DESCRIPTION OF THE INVENTION

This invention is particularly adapted for use in apparatus employed in a system wherein loose carbon black is fed to carbon black pelleting apparatus. In such pelleting operation it is necessary to provide a precise feed into the pelleter to maintain a proper load and proper pelleting conditions in the apparatus which will assure a desirably uniform pellet product.

Figure 1:
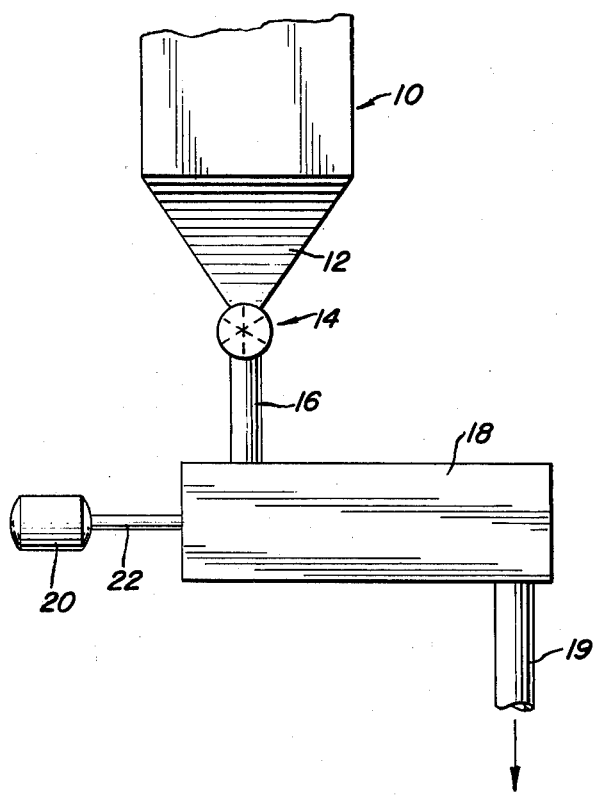
FIG. 1 is a fragmentary, schematic, vertical elevation of a feeding system employing a rotary feeder made in accordance with this invention.

Referring now to the drawing and more particularly to FIG. 1, a hopper 10 is fragmentarily illustrated which receives carbon black from a conveyor or cyclone collector (not illustrated) communicating with a source of carbon black. Hopper 10 has a lower conical section 12 which discharges carbon black contained in the hopper 10 through rotary feeder 14 into conduit 16 which enters the top of pelleter 18. Pelleter 18 is powered by motor 20 through shaft 22. The pelleted carbon black is discharged from the pelleter 18 through discharge conduit 19.

The rotary feeder normally employed in systems such as that illustrated in FIG. 1 comprise a rotatable valve having a central rotatable shaft from which material-engaging vanes radially extend. The vanes comprise plates having planar material-engaging faces. The opposed shaft ends may be journalled in bearings disposed in opposite wall portions of the housing. The feeder housing has a curved inner wall surface over which the vanes pass in the course of sweeping the carbon black or other particulate material to be fed from the housing inlet to the housing outlet.

In accordance with this invention it has been found that the rate of feeding particulate material by means of such a rotary feeder from a supply source to a zone of use may be dramatically increased if clearances are provided in the rotary feeder between the feeder housing inner wall and alternate vanes of the rotatable valve disposed in the feeder.

Figure 2:
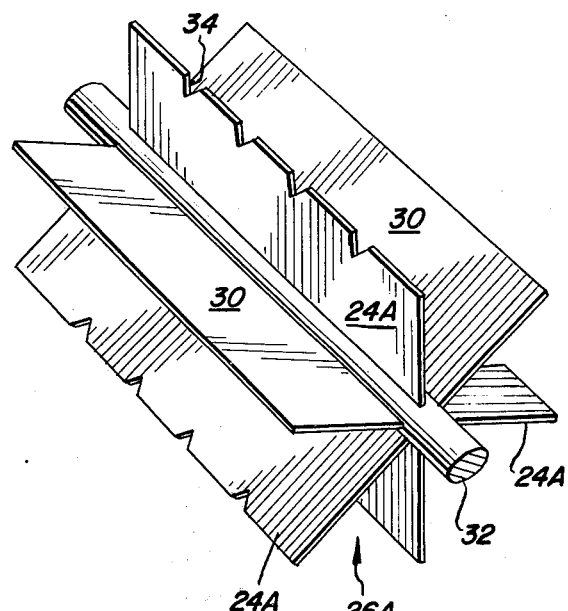
FIG. 2 is a perspective view of a rotatable valve made in accordance with invention.
Figure 4:
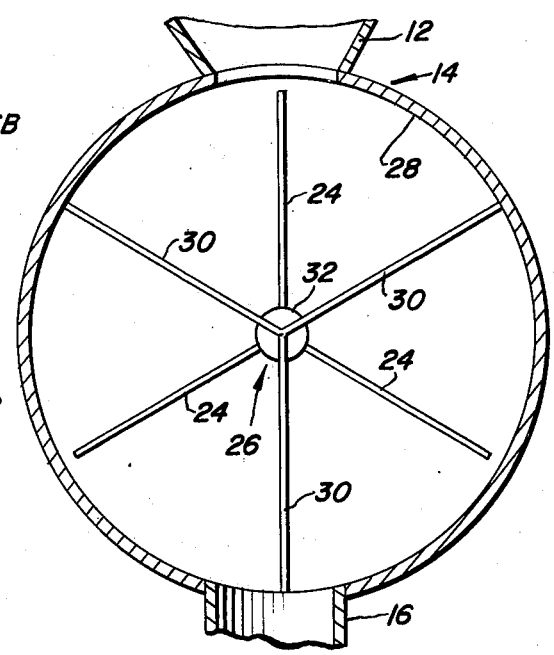
FIG. 4 is an end view of a second modified rotatable valve made in accordance with this invention disposed in a housing illustrated in section.

Thus, it will be noted from FIG. 4 that alternate vanes 24 of rotatable valve 26 have distal edge portions spaced from surrounding housing wall 28 of feeder 14 so as to form clearances, whereas vanes 30 are in close proximity or touching engagement with curved wall 28 and, as shown in FIG. 2, are imperforate. Vanes 24 and 30 radially extend from rotatable shaft 32 journalled at opposed ends in bearings disposed in housing side portions of the feeder 14. In the valve embodiment of FIG. 4 the clearances between the alternate vanes 24 and housing wall 28 are effected by shortening the vane widths.

The clearances between the alternate vanes and encompassing housing surface portions may take the form of V-shaped notches formed in the distal edges of the vanes. Notches 34 in valve 26A (illustrated in FIG. 2) are formed in alternate vanes 24A in the form of equilateral triangles. The vane-housing wall clearances provided by the notches effect a desired increase in feed rate through the feeder while enabling the particulate material to be fed uniformly and under control effected by regulation of the speed of rotation of the valve. As will be seen from the drawing, the clearances are preferably uniformly arranged across the width of the alternate vanes effecting clearances with the housing wall.

Figure 3:
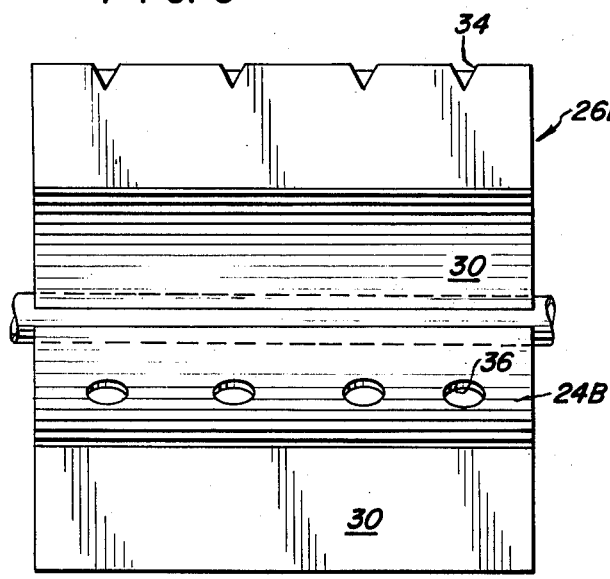
FIG. 3 is a side elevational view of a modified rotatable valve made in accordance with this invention.

The "clearances" between the valve alternate vanes and the housing curved wall portions may be of any configuration and disposed on the leading or side edges, or may comprise apertures in the bodies of the vanes themselves such as apertures 36 illustrated in vanes 24B of valve 26B of FIG. 3.

It has been found that the range of open area or clearance between each alternate vane and the surrounding housing surface of the feeder should be preferably about 0.5% to 5% of the normal full vane surface area. By way of example, a rotary feeder having a diameter of 18 inches could employ an open or clearance area in the alternate vanes of approximately 2 square inches or approximately 1.2% of the normal area of 162 square inches. It has been found that the number of vanes in the feeder valves should preferably be of a number between six and 12.

Utilizing a rotary feeder employing the normal vane-housing wall, substantially-touching relationship to permit free rotation of the rotary valve in the feeder housing, the rate of feeding carbon black to a pelleter through an 18 inch rotary feeder could not exceed 3,000 pounds per hour. The formation of clearances amounting to 1.2% of the total vane area in the form for instance of the notches 34 illustrated in FIG. 2 increased the feed rates to over 4,000 pounds per hour.

It is believed that the clearances may serve as a pressure equalizing means between the system portions on opposite sides of the rotary feeder 14. In the course of attempting to feed particulate matter at a constant rate by means such as a rotary feeder rotating at a constant speed, gas pockets often accumulate in the source of the particulate matter which obstruct the free passage of such particles through the system thereby rendering feeding erratic. Gases may also be intentionally introduced into the system to break down bridging which may occur in the particle source portion of the system such as in hopper 10 of FIG. 1. Such introduced gases, however, although eliminating bridging, may form flow-obstructing pressure pockets. By providing regularly recurring clearances in the rotary feeder by means of the alternate vanes having the reduced surface areas, gas passage through the rotary feeder is permitted. Such passage eliminates pockets and enables feeding of the particulate matter to carry on in an efficient uniform manner through the rotary feeder. Thus, a simple expedient is provided in a basic rotary feeder construction for relieving gaseous pressure opposing flow which is located upstream of the rotary feeder.

The provided invention may employ any of a variety of clearance forms between the alternate vanes and the surrounding housing as above noted. As has also been above noted the workable clearances in terms of vane area are also variable.

The valves of this invention require nothing unique in the way of unusual manufacturing techniques or manufacturing apparatus and may readily be inserted in feeders disposed in systems already operating in the field. Although the rotatable valves disclosed employ planar vanes or impellers of rectilinear peripheral configuration, other vane configurations may be employed to advantage for purposes of obtaining the benefits of this invention.

I claim:

1. In a rotary feeder for feeding particulate matter from a supply source to a zone of use, the combination comprising a housing having a curved inner wall surface, a valve rotatably mounted in said housing and having a central shaft and a plurality of vanes having material engaging surfaces radially extending from said shaft, first alternate imperforate vanes having edges in close proximity to said housing inner wall surface whereby said first alternate vanes rotate with substantially no clearance between said vanes and the housing inner wall surface, second alternate vanes defining clearances, at least in part, through which gases may pass in the normal course of valve rotation; said housing being in communication with a particulate material inlet and a particulate material outlet whereby rotation of said rotary valve will sweep particulate matter from said inlet to said outlet over said housing inner wall surface.

2. The feeder of claim 1 in which said clearances comprise V-shaped notches formed in the distal edge portions of said second alternate vanes.

3. The feeder of claim 2 in which said feeder has between six and 12 vanes and said V-shaped notches are in the form of equilateral triangles.

4. The feeder of claim 1 in which said clearances comprise intervals between distal edge portions of said second alternate vanes and the surrounding housing wall surface.

5. The feeder of claim 1 in which the range of clearance area between the material engaging faces and the housing wall surface in the second alternate vanes is between approximately 0.5% to 5% based upon the area of said first alternate vanes material engaging faces.

6. The feeder of claim 1 in which said clearances comprise apertures disposed in said second alternate vanes.

* * * * *